United States Patent
Ma et al.

(10) Patent No.: US 10,928,965 B2
(45) Date of Patent: Feb. 23, 2021

(54) TOUCH PANEL, METHOD FOR MANUFACTURING THE SAME AND TOUCH DEVICE

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Weijie Ma, Beijing (CN); Cui Chen, Beijing (CN); Yadong Yuan, Beijing (CN); Run Chen, Beijing (CN); Zhanqi Xu, Beijing (CN)

(73) Assignees: HEFEI XINSHENG OPTOELECTRONICS TECHNOLOGY CO., LTD., Hefei (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/639,637

(22) PCT Filed: Apr. 18, 2019

(86) PCT No.: PCT/CN2019/083253
§ 371 (c)(1),
(2) Date: Feb. 17, 2020

(87) PCT Pub. No.: WO2019/218837
PCT Pub. Date: Nov. 21, 2019

(65) Prior Publication Data
US 2020/0174624 A1    Jun. 4, 2020

(30) Foreign Application Priority Data
May 16, 2018  (CN) .......................... 201810468639.0

(51) Int. Cl.
G06F 3/044    (2006.01)

(52) U.S. Cl.
CPC .......... G06F 3/0446 (2019.05); G06F 3/0443 (2019.05); *G06F 2203/04103* (2013.01); *G06F 2203/04112* (2013.01)

(58) Field of Classification Search
CPC .... G06F 3/0448; G06F 3/0446; G06F 3/0445; G06F 2203/04112; G06F 2203/04103; G06F 3/0443
See application file for complete search history.

(56) References Cited

U.S. PATENT DOCUMENTS 10,013,097 B2   7/2018   Choung et al.
10,043,479 B2   8/2018   Hung et al.
(Continued)

FOREIGN PATENT DOCUMENTS

CN   104216598 A   12/2014
CN   104820510 A   8/2015
(Continued)

OTHER PUBLICATIONS

First Office Action, including Search Report, for Chinese Patent Application No. 201810468639.0, dated Aug. 19, 2019, 17 pages.

*Primary Examiner* — Abbas I Abdulselam
(74) *Attorney, Agent, or Firm* — Westman, Champlin & Koehler, P.A.

(57) ABSTRACT

A touch panel, a method for manufacturing the same, and a touch device are provided. The method for manufacturing a touch panel includes: forming a first touch electrode and a first auxiliary electrode on a base substrate, the first touch electrode being in a mesh shape, the first auxiliary electrode being spaced apart from and insulated from the first touch electrode; forming a first insulating layer on the first touch electrode, the first insulating layer covering the first touch electrode and exposing at least a portion of the first auxiliary electrode; forming a first metal layer covering the first insulating layer and the at least a portion of the first auxiliary
(Continued)

electrode; and patterning the at least a portion of the first auxiliary electrode and the first metal layer to form a second touch electrode in a mesh shape.

20 Claims, 7 Drawing Sheets

(56) References Cited

U.S. PATENT DOCUMENTS

| | | | |
|---|---|---|---|
| 10,444,914 | B2 | 10/2019 | Xie et al. |
| 2014/0284079 | A1 | 9/2014 | Zhou |
| 2015/0220202 | A1 | 8/2015 | Choung et al. |
| 2016/0062518 | A1 | 3/2016 | Ding et al. |
| 2016/0070395 | A1 | 3/2016 | Hung et al. |
| 2017/0160854 | A1 | 6/2017 | Huang |
| 2017/0308201 | A1 | 10/2017 | Xie et al. |
| 2018/0292926 | A1* | 10/2018 | Ye .................. H01L 27/322 |
| 2020/0174624 | A1 | 6/2020 | Ma et al. |

FOREIGN PATENT DOCUMENTS

| | | | |
|---|---|---|---|
| CN | 105159515 | A | 12/2015 |
| CN | 105446522 | A | 3/2016 |
| CN | 206322134 | U | 7/2017 |
| CN | 107765917 | A | 3/2018 |
| CN | 108415621 | A | 8/2018 |

* cited by examiner

TOUCH PANEL, METHOD FOR MANUFACTURING THE SAME AND TOUCH DEVICE

CROSS-REFERENCE TO RELATED APPLICATION

The present disclosure is a National Stage Application of International Application No. PCT/CN2019/083253, filed on Apr. 18, 2019, and claims the benefit of Chinese Patent Application No. 201810468639.0 filed on May 16, 2018 in the National Intellectual Property Administration of China, the disclosures of which are incorporated herein by reference.

TECHNICAL FIELD

The present disclosure relates to a field of semiconductor technology, and in particular, to a touch panel, a method for manufacturing the same, and a touch device.

BACKGROUND

Affected by the market of low-priced smartphones and tablets, the price war in the touch panel industry is intensifying. After a fierce market competition, some small and medium-sized touch panel manufacturers who are in a weak position face the pressure of being eliminated. Facing such a pressure, touch panel manufacturers need to find new alternative materials to reduce cost pressure.

However, in the prior art, when a metal mesh touch electrode is used, there is a problem that the wiring resistance is large and the power consumption of the touch panel is large.

SUMMARY

Some embodiments of the present disclosure provide a method for manufacturing a touch panel, comprising: forming a first touch electrode and a first auxiliary electrode on a base substrate, the first touch electrode being in a mesh shape, the first auxiliary electrode being spaced apart from and insulated from the first touch electrode; forming a first insulating layer on the first touch electrode, the first insulating layer covering the first touch electrode and exposing at least a portion of the first auxiliary electrode; forming a first metal layer covering the first insulating layer and the at least a portion of the first auxiliary electrode; and patterning the at least a portion of the first auxiliary electrode and the first metal layer to form a second touch electrode in a mesh shape.

In some embodiments, before forming the first touch electrode and the first auxiliary electrode on the base substrate, the method further comprises: forming a second metal layer on the base substrate, wherein the first touch electrode and the first auxiliary electrode are simultaneously formed by patterning the second metal layer.

In some embodiments, before forming the first metal layer, the method further comprises: forming a second auxiliary electrode on an edge region of the base substrate, the first metal layer formed subsequently covering at least a portion of the second auxiliary electrode; and patterning the first metal layer and the at least a portion of the second auxiliary electrode to form a touch lead wire.

In some embodiments, the first touch electrode, the first auxiliary electrode, and the second auxiliary electrode are formed simultaneously by using a same patterning process.

In some embodiments, the second touch electrode and the touch lead wire are formed by using a same patterning process.

In some embodiments, the first insulating layer is in a mesh shape, and an orthographic projection of the first touch electrode on the base substrate falls within an orthographic projection of the first insulating layer on the base substrate.

In some embodiments, a line width of the first touch electrode ranges from 2 μm to 5 μm, and a line width of the first insulating layer ranges from 8 μm to 11 μm.

In some embodiments, the method further comprising: forming a second insulating layer on the base substrate on which the second touch electrode is formed, the second insulating layer covering the second touch electrode.

In some embodiments, the second insulating layer is in a mesh shape, and an orthographic projection of the second touch electrode on the base substrate falls within an orthographic projection of the second insulating layer on the base substrate.

In some embodiments, a line width of the second touch electrode ranges from 2 μm to 5 μm, and a line width of the second insulating layer ranges from 8 μm to 11 μm.

In some embodiments, an interval between the first auxiliary electrode and the first touch electrode ranges from 3 μm to 5 μm.

In some embodiments, the first touch electrode in the mesh shape has a plurality of openings, the first auxiliary electrode comprises a plurality of first auxiliary sub-electrodes, and the plurality of first auxiliary sub-electrodes are located in the plurality of openings, respectively.

Some embodiments of the present disclosure provide a touch panel comprising: a base substrate; a first touch electrode in a mesh shape and a second touch electrode in a mesh shape on the base substrate, and the second touch electrode and the first touch electrode being arranged to cross each other; and a first insulating layer disposed at least in a plurality of crossing regions of the first touch electrode and the second touch electrode, and disposed between the first touch electrode and the second touch electrode; wherein a first portion of the second touch electrode located between at least two adjacent crossing regions comprises a first electrode layer and a second electrode layer stacked on each other, the first electrode layer is located between the base substrate and the second electrode layer, and the first touch electrode and the first electrode layer are arranged in a same layer with a same material.

In some embodiments, the touch panel further comprising: a touch lead wire located at an edge region of the base substrate, wherein the touch lead wire comprises a third electrode layer and a fourth electrode layer stacked on each other, the third electrode layer is located between the base substrate and the fourth electrode layer, and the first touch electrode and the third electrode layers are arranged in a same layer with a same material.

In some embodiments, the first insulating layer is in a mesh shape, and an orthographic projection of the first touch electrode on the base substrate falls within an orthographic projection of the first insulating layer on the base substrate.

In some embodiments, a line width of the first touch electrode ranges from 2 μm to 5 μm, and a line width of the first insulating layer ranges from 8 μm to 11 μm.

In some embodiments, the touch panel further comprising: a second insulating layer on the second touch electrode, wherein the second insulating layer covers the second touch electrode.

In some embodiments, the second insulating layer is in a mesh shape, and an orthographic projection of the second touch electrode on the base substrate falls within an orthographic projection of the second insulation layer on the base substrate.

In some embodiments, a line width of the second touch electrode ranges from 2 μm to 5 μm, and a line width of the second insulating layer ranges from 8 μm to 11 μm.

Some embodiments of the present disclosure provide a touch device comprising the touch panel according to the above embodiments.

DETAILED DESCRIPTION OF THE EMBODIMENTS

In order to make the objectives, technical solutions, and advantages of the embodiments of the present disclosure more clear, the technical solutions of the embodiments of the present disclosure will be described clearly and completely with reference to the accompanying drawings of the embodiments of the present disclosure. Obviously, the described embodiments are some of embodiments of the present disclosure, but not all the embodiments. Based on the described embodiments of the present disclosure, all other embodiments obtained by those skilled in the art without creative work shall fall within the protection scope of the present disclosure.

Unless otherwise defined, the technical or scientific terms used in the present disclosure shall have the ordinary meanings understood by those with ordinary skills in the field to which the present disclosure belongs. Terms "first", "second" and the like used in the present disclosure do not indicate any order, quantity, or importance, but are only used to distinguish different components. Words such as "comprise/comprising" or "include/including" mean that the element or item appearing before the words covers the element or item appearing after the words and the equivalent thereof without excluding other elements or items. Words such as "connected" or "connecting" are not limited to physical or mechanical connections, but may include electrical connections, whether direct or indirect. "Up", "down", "left", "right", etc. are only used to indicate the relative position relationship. When an absolute position of the described object is changed, its relative position may also be changed accordingly.

To keep the following description of the embodiments of the present disclosure clear and concise, the present disclosure omits detailed descriptions of known functions and known components.

With the development of touch technology, metal mesh technology has gradually attracted the attention of the industry. Compared with a touch panel of related art in which ITO is used as a touch electrode, a touch panel using the metal mesh technology may greatly reduce costs. The applicant found that in the related art, when the metal mesh technology is used to fabricate a touch electrode, the formed touch electrode has a large impedance, and the formed touch panel consumes large power.

Figure 1:
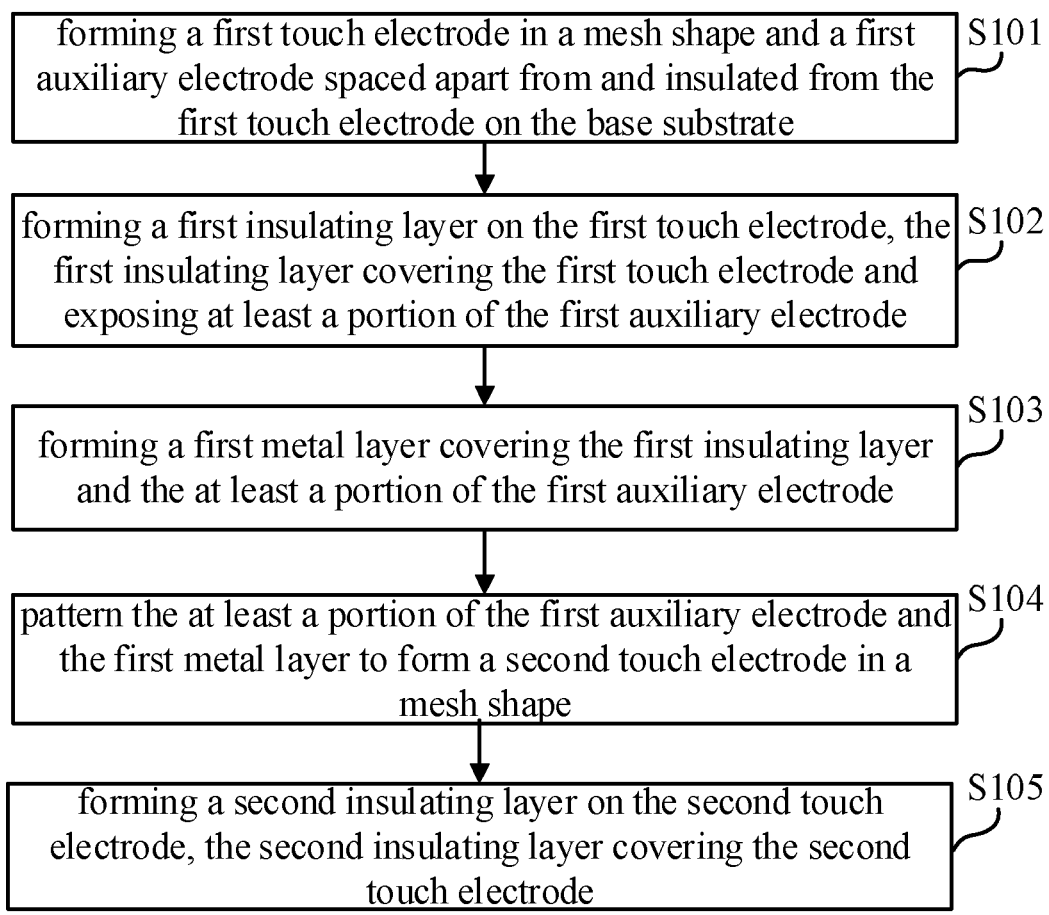
FIG. 1 is a flowchart of a method for manufacturing a touch panel according to some embodiments of the present disclosure.

FIG. 1 is a flowchart of a method for manufacturing a touch panel according to some embodiments of the present disclosure. Referring to FIG. 1, some embodiments of the present disclosure provide a method for manufacturing a touch panel. The method includes the following steps:

Step S101: forming a first touch electrode in a mesh shape and a first auxiliary electrode spaced apart from and insulated from the first touch electrode on the base substrate, the first auxiliary electrode including a plurality of first auxiliary sub-electrodes located in meshes;

Step S102: forming a first insulating layer on the first touch electrode, the first insulating layer covering the first touch electrode and exposing at least a portion of the first auxiliary electrode;

Step S103: forming a first metal layer covering the first insulating layer and the at least a portion of the first auxiliary electrode;

Step S104: patterning the at least a portion of the first auxiliary electrode and the first metal layer to form a second touch electrode in a mesh shape.

In the method for manufacturing the touch panel provided by the embodiments, the first auxiliary electrode is retained while forming the first touch electrode in a mesh shape, and then a first metal layer for forming a second touch electrode is formed, and then the first auxiliary electrode and the first metal layer are patterned to form the second touch electrode in the mesh shape. As a result, the formed second touch electrode has a double-layer metal stacked structure, which may effectively reduce the impedance of the second touch electrode, thereby reducing the power consumption of the touch panel.

Figure 2A:
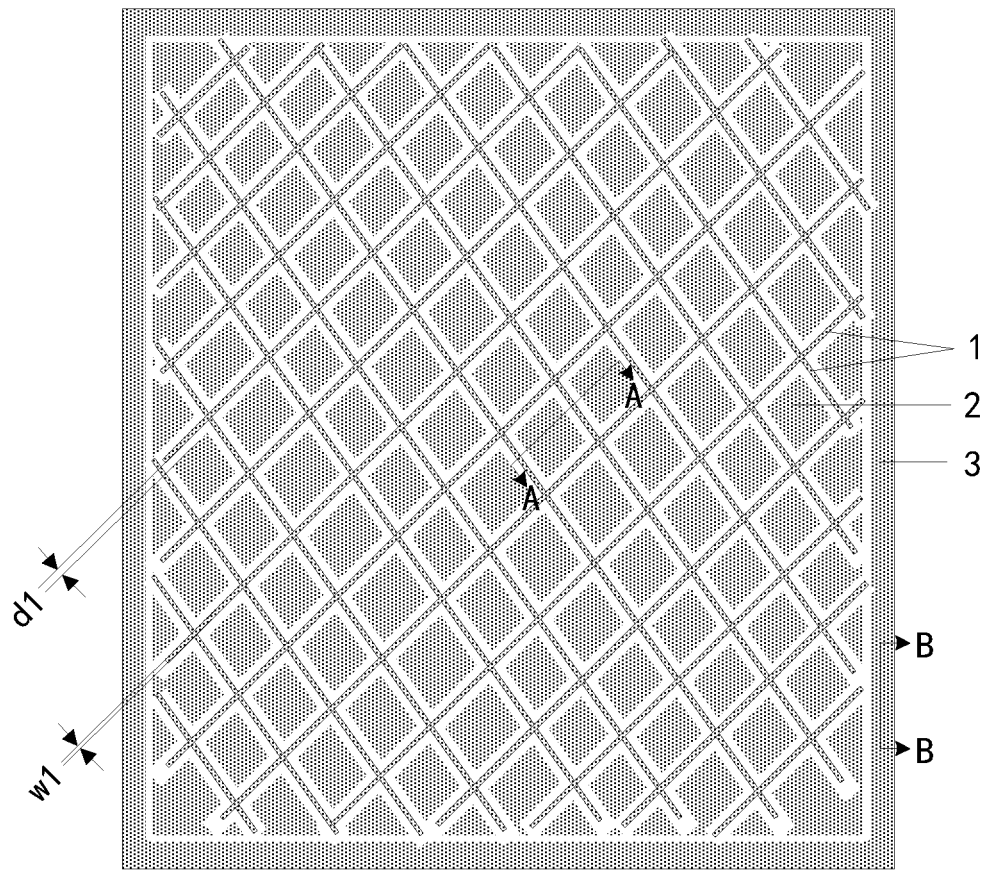
FIG. 2A is a schematic plan view of a touch panel being manufactured by the method in FIG. 1 after completing step S101 of the method according to some embodiments of the present disclosure.
Figure 2B:
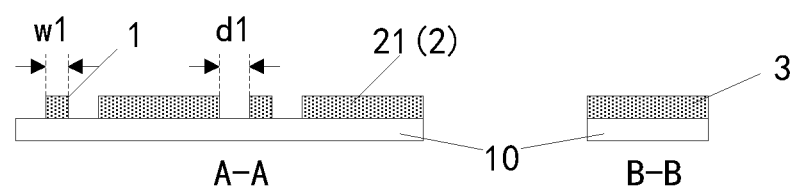
FIG. 2B shows schematic cross-sectional views of the touch panel in FIG. 2A respectively taken along line A-A and line B-B.

FIG. 2A is a schematic plan view of a touch panel being manufactured by the method in FIG. 1 after completing step S101 of the method provided by some embodiments of the present disclosure, and FIG. 2B shows schematic cross-sectional views of the touch panel in FIG. 2A respectively taken along line A-A and line B-B.

In step S101, as shown in FIGS. 2A and 2B, a first touch electrode 1 and a first auxiliary electrode 2 are formed on the base substrate 10. The first touch electrode 11 is in a mesh shape and has a plurality of openings. The first auxiliary electrode 2 includes a plurality of first auxiliary sub-electrodes 21 located in the plurality of openings respectively, that is, the first auxiliary sub-electrodes 21 are located in meshes. The first auxiliary electrode 2 and the first touch electrode 1 are spaced apart from and insulated from each other. Specifically, for each first auxiliary sub-electrode 21, a shape thereof may be similar to that of an opening where it is located, but the area thereof is smaller than that of the opening where it is located, so as to ensure that the first touch electrode 1 and the first auxiliary electrode 2 are spaced apart from each other. Specifically, a distance dl between the first auxiliary electrode 2 and the first touch electrode 1 surrounding the first auxiliary electrode 2 ranges from 3 μm to 5 μm, and the two are insulated from each other. The first touch electrode 1 may be used as a touch sensing electrode or a touch driving electrode.

Figure 3A:
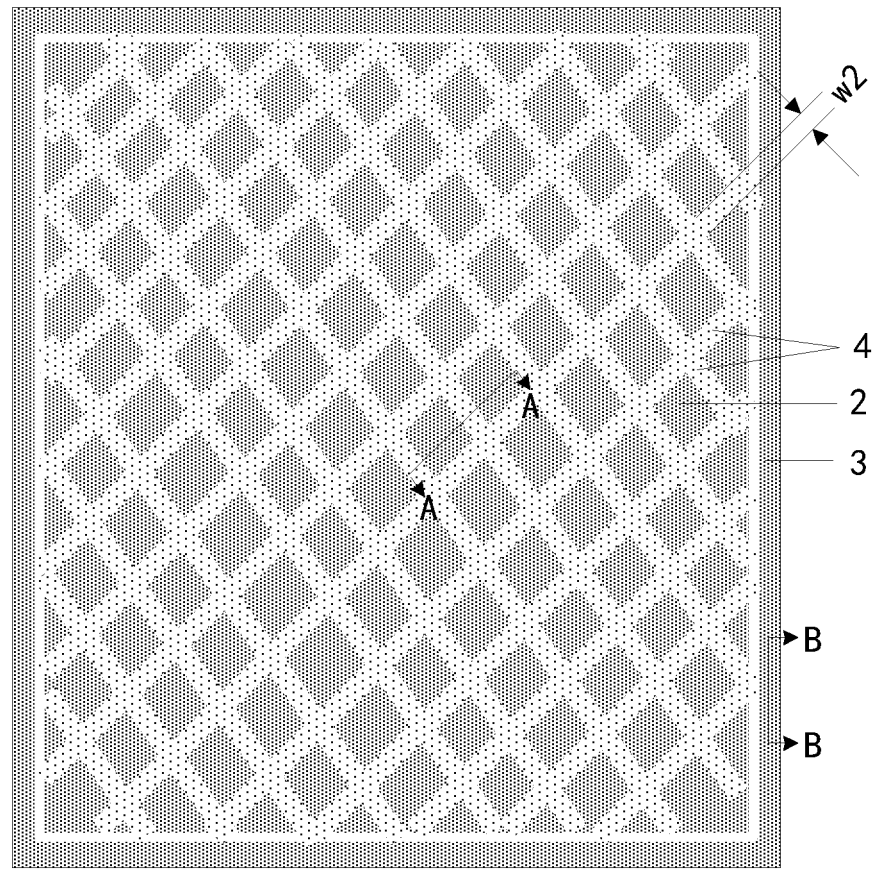
FIG. 3A is a schematic plan view of a touch panel being manufactured by the method in FIG. 1 after completing step S102 of the method according to some embodiments of the present disclosure, the touch panel.
Figure 3B:
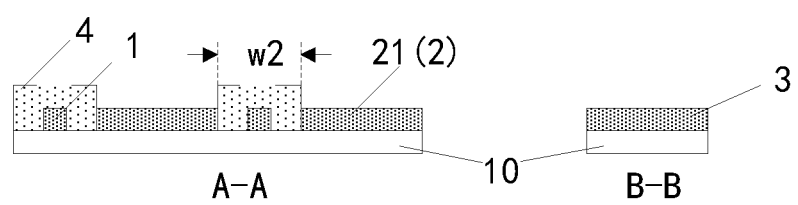
FIG. 3B shows schematic cross-sectional views of the touch panel in FIG. 3A respectively taken along line A-A and line B-B.

FIG. 3A is a schematic plan view of a touch panel being manufactured by the method in FIG. 1 after completing step S102 of the method provided by some embodiments of the present disclosure, the touch panel, and FIG. 3B shows schematic cross-sectional views of the touch panel in FIG. 3A respectively taken along line A-A and line B-B.

In step S102, as shown in FIGS. 3A and 3B, a first insulating layer 4 is formed on the base substrate 10 on which the first touch electrode 1 and the first auxiliary electrode 2 have been formed. The first insulating layer 4 covers the first touch electrode 1 and exposes at least a portion of the first auxiliary electrode 2. A pattern of the first insulating layer 4 is similar to that of the first touch electrode 1 and is also a mesh pattern. An orthographic projection of the first touch electrode 1 on the base substrate 10 falls within an orthographic projection of the first insulating layer 4 on the base substrate 10. Specifically, in order to make the first insulation layer 4 completely cover the first touch electrode 1, a line width of the first insulating layer 4 is increased by 3 μm to 6 μm compared to a line width of the first touch electrode 1. For example, the line width w1 of the first touch electrode 1 (that is, a width of each of wirings constituting the first touch electrode 1 in the mesh shape) generally ranges from 2 μm to 5 μm, and the line width w2 of the first insulating layer 4 may ranges from 8 μm to 11 μm.

The first insulating layer 4 may be formed by a patterning process. Specifically, for example, a first insulating material layer is deposited on the base substrate 10 on which the first touch electrode 1 and the first auxiliary electrode 2 have been formed, the first insulating material is coated with an photoresist, the photoresist is exposed with a mask, the exposed photoresist is developed, the first insulating material layer is etched, and the remaining photoresist is peeled off, so as to obtain the first insulating layer 4 in a mesh shape.

In some embodiments, as shown in FIGS. 3A and 3B, the first insulating layer 4 does not overlap with the first auxiliary electrode 2, that is, the first insulating layer 4 only covers the first touch electrode 1 and completely exposes the first auxiliary electrode 2.

Figure 4A:
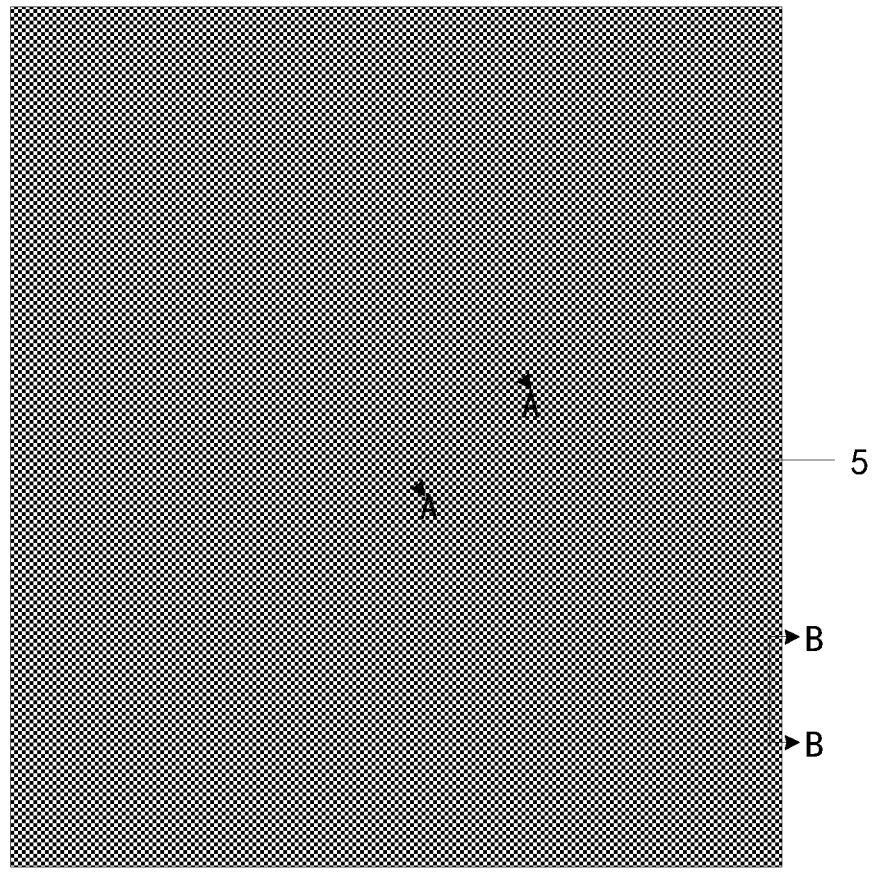
FIG. 4A is a schematic plan view of a touch panel being manufactured by the method in FIG. 1 after completing step S103 of the method according to some embodiments of the present disclosure.
Figure 4B:
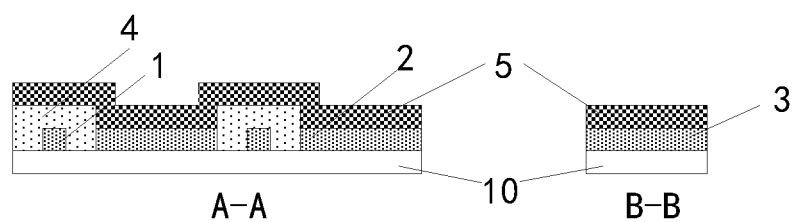
FIG. 4B shows schematic cross-sectional views of the touch panel in FIG. 4A respectively taken along line A-A and line B-B.

FIG. 4A is a schematic plan view of a touch panel being manufactured by the method in FIG. 1 after completing step S103 of the method provided by some embodiments of the present disclosure, and FIG. 4B shows schematic cross-sectional views of the touch panel in FIG. 4A respectively taken along line A-A and line B-B.

In step S103, as shown in FIGS. 4A and 4B, a first metal layer 5 is formed on the base substrate 10 on which the first insulating layer 4 is formed. For example, the first metal layer 5 covers the entire upper surface of the base substrate 10. In this case, the first metal layer 5 is in contact with the first auxiliary electrode 2. In some embodiments, the first metal layer 5 is formed by magnetron sputtering.

Figure 5A:
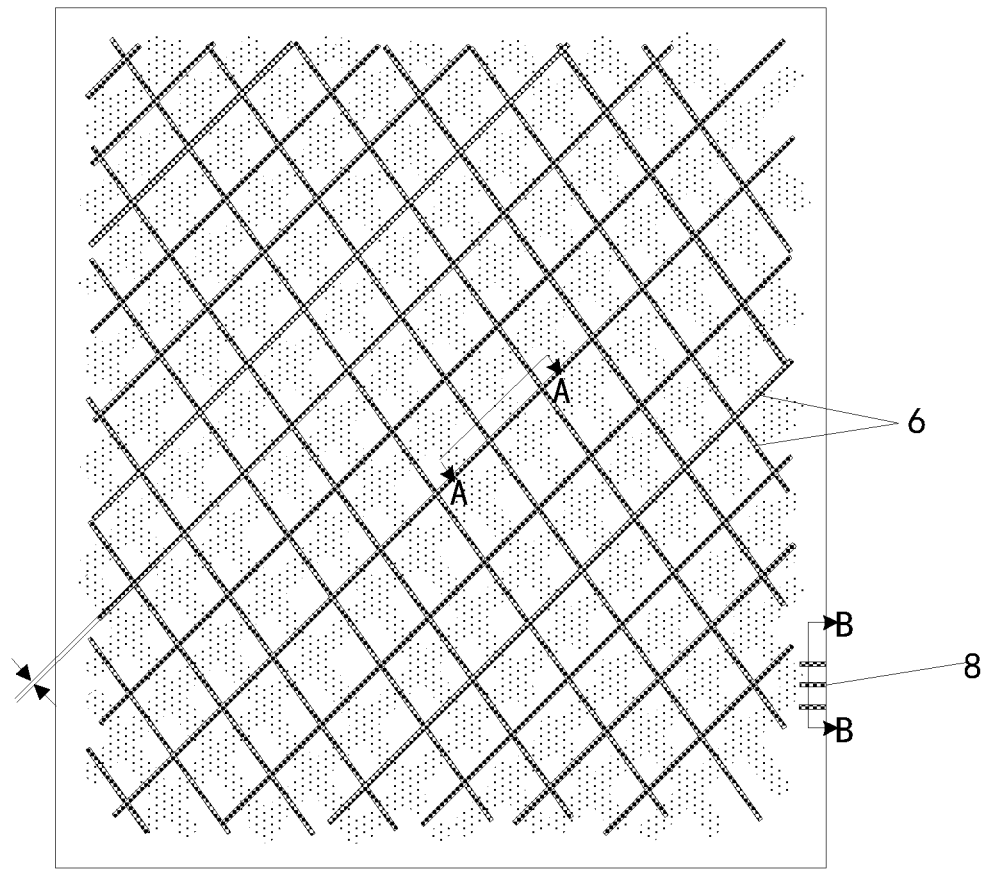
FIG. 5A is a schematic plan view of a touch panel being manufactured by the method in FIG. 1 after completing step S104 of the method according to some embodiments of the present disclosure, the touch panel.
Figure 5B:
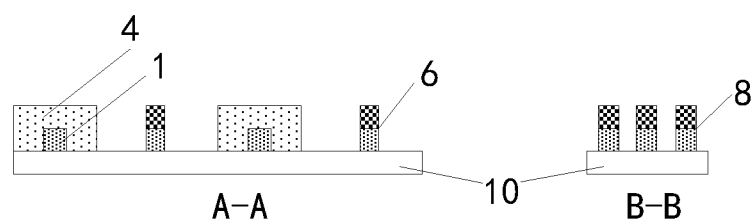
FIG. 5B shows schematic cross-sectional views of the touch panel in FIG. 5A respectively taken along line A-A and line B-B.

FIG. 5A is a schematic plan view of a touch panel being manufactured by the method in FIG. 1 after completing step S104 of the method provided by some embodiments of the present disclosure, the touch panel, and FIG. 5B shows schematic cross-sectional views of the touch panel in FIG. 5A respectively taken along line A-A and line B-B.

In step S104, referring to FIGS. 5A and 5B, the first auxiliary electrode 2 and the first metal layer 5 are patterned to form a second touch electrode 6 in a mesh shape. In this case, the formed second touch electrode 6 is similar in shape to the formed first touch electrode 5, which may have a visual matting effect and avoid defects such as white lines and black lines. The second touch electrode 6 has a double-layer structure, and may be used as a touch sensing electrode or a touch driving electrode.

In the method for manufacturing the touch panel provided in the embodiments, the pattern of first auxiliary electrode in the meshes is retained while forming the first touch electrode in a mesh shape, and then the first metal layer for forming the second touch electrode is formed, and then the first auxiliary electrode surrounded by the first touch electrode and the first metal layer are patterned to form the second touch electrode in the mesh shape. As a result, the formed second touch electrode has a double-layer metal stacked structure, which may effectively reduce the impedance of the second touch electrode, thereby reducing the power consumption of the touch panel.

In some embodiments, referring to FIG. 1, after patterning the first auxiliary electrode 2 and the first metal layer 5 to form the second touch electrode 6 in the mesh shape, the method for manufacturing the touch panel further includes: step S105: forming a second insulating layer on the second touch electrode, the second insulating layer covering the second touch electrode.

Figure 6A:
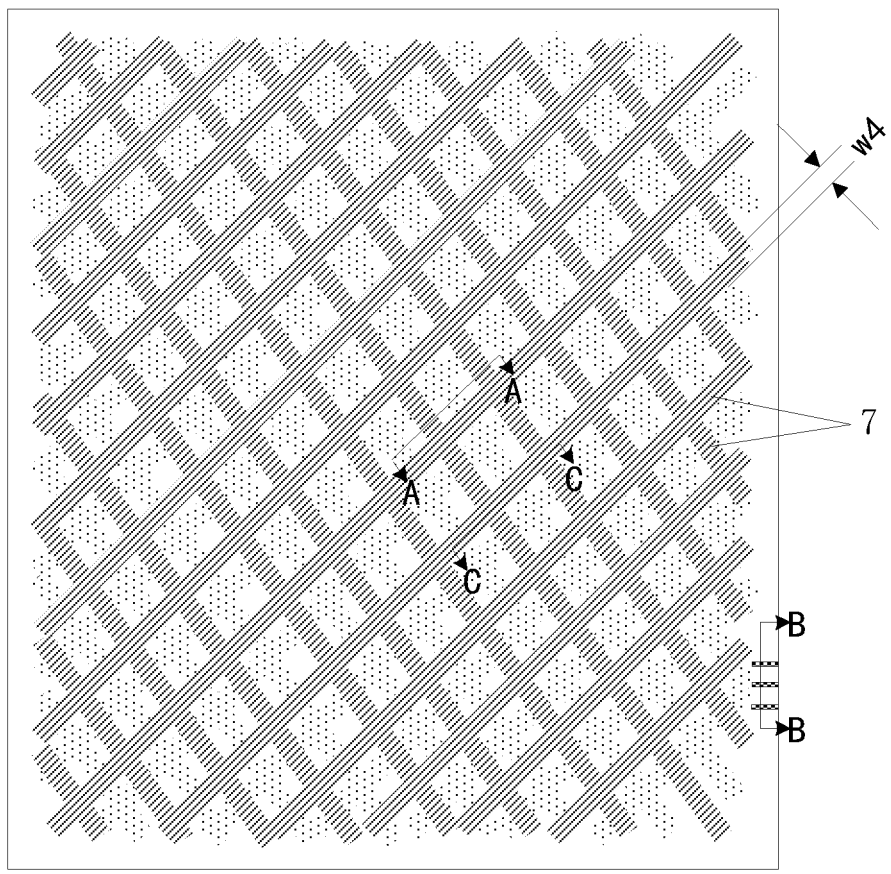
FIG. 6A is a schematic plan view of a touch panel being manufactured by the method in FIG. 1 after completing step S105 of the method according to some embodiments of the present disclosure, the touch panel.
Figure 6B:
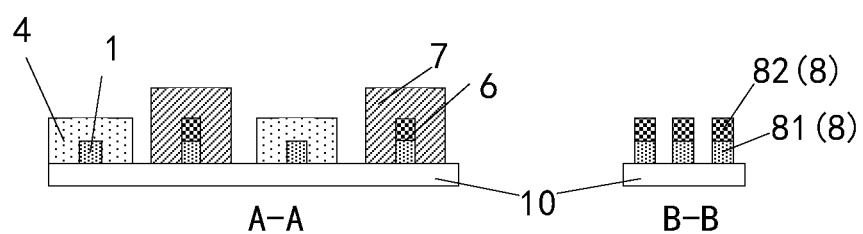
FIG. 6B shows schematic cross-sectional views of the touch panel in FIG. 6A respectively taken along line A-A and line B-B.
Figure 6C:
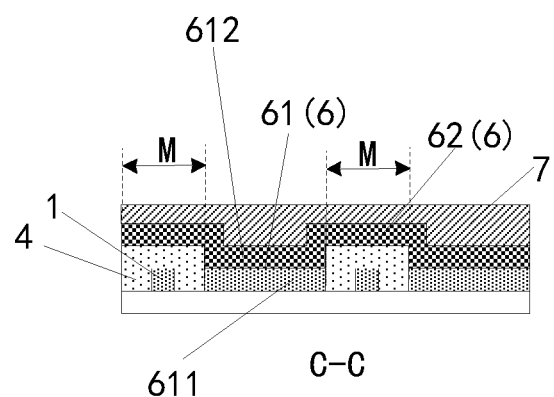
FIG. 6C is a schematic cross-sectional view of the touch panel in FIG. 6A taken along line C-C.

FIG. 6A is a schematic plan view of a touch panel being manufactured by the method in FIG. 1 after completing step S105 of the method provided by some embodiments of the present disclosure, and FIG. 6B shows schematic cross-sectional views of the touch panel in FIG. 6A respectively taken along line A-A and line B-B. FIG. 6C is a schematic cross-sectional view of the touch panel in FIG. 6A taken along line C-C.

In step 105, referring to FIGS. 6A-6C, a second insulating layer 7 is formed on the base substrate 10 on which the second touch electrode 6 is formed. The second insulating layer 7 covers the second touch electrode 6 to avoid the second touch electrode 6 is corroded by external water and oxygen. In some embodiments, the second insulating layer 7 has a pattern similar to that of the second touch electrode 6, and also in a mesh shape. An orthographic projection of the second touch electrode 6 on the base substrate 10 falls within in an orthographic projection of the second insulating layer 7 on the base substrate 10. In order to make the second insulating layer 7 completely cover the second touch electrode 6, a line width of the second insulating layer 7 is increased by 3 μm to 6 μm compared to a line width of the second touch electrode 6. For example, the line width w3 of the second touch electrode 6 (that is, a width of each of wirings constituting the second touch electrode 6 in the mesh shape) generally ranges from 2 μm to 5 μm, and the line width w4 of the second insulating layer 7 may range from 8 μm to 11 μm. In the embodiments, the second insulating layer 7 only covers the second touch electrode 6, which may effectively improve the transmittance of the touch panel compared to a case in which the second insulating layer covers the entire surface of the base substrate.

In some embodiments, the second insulating layer 7 may cover the entire upper surface of the base substrate 10, and the effect of protecting the second touch electrode 6 may also be achieved, which is not limited in the present disclosure.

In some embodiments, in step S101, the first touch electrode 1 in the mesh shape and the first auxiliary electrode 2 spaced apart from and insulated from the first touch electrode 1 may be formed by a same patterning process. For example, a second metal layer is formed on the base substrate 10, and the second metal layer is patterned to form the first touch electrode 1 and the first auxiliary electrode 2 simultaneously. The second metal layer may cover the entire base substrate 10 in a deposition or sputtering manner, and a step of patterning the second metal layer may include processes such as photoresist coating, exposing, developing, etching, and peeling off. A material of the second metal layer may be Al, AlNd, Au, or the like.

In some embodiments, before forming the first metal layer, the method for manufacturing the touch panel further includes: forming a second auxiliary electrode on an edge region of the base substrate. Referring to FIGS. 2A and 2B, while the first touch electrode 1 in the mesh shape and the first auxiliary electrode 2 including block-shaped first auxiliary sub-electrodes 21 located in meshes are formed on the base substrate 10, the second auxiliary electrode 3 is formed on the base substrate 10. The second auxiliary electrode 3 is formed on the edge region of the base substrate 10, such as a peripheral region shown in FIG. 2A. The second auxiliary electrode 3 is, for example, in a ring shape, and the first touch electrode 1 and the first auxiliary electrode 2 are formed in a middle/center region of the substrate 10 surrounded by the edge region. In some embodiments, the second auxiliary electrode 3 is formed synchronously with the first touch electrode 1 and the first auxiliary electrode 2 by patterning the second metal layer.

In some embodiments, the subsequently formed first metal layer 5 covers at least a portion of the second auxiliary electrode 3. For example, as shown in FIGS. 4A and 4B, the subsequently formed first metal layer 5 covers the entire upper surface of the base substrate 10, and covers the second auxiliary electrode 3 completely.

In some embodiments, the method for manufacturing the touch panel further includes: patterning the at least a portion of the second auxiliary electrode and the first metal layer to form a touch lead wire. Referring to FIGS. 5A and 5B, the second auxiliary electrode 3 and the first metal layer 5 are patterned to form the touch lead wire 8 while the first auxiliary electrode 2 and the first metal layer 5 are patterned to form the second touch electrode 6 in the mesh shape, and the second touch electrodes 6 and the touch lead wire 8 are formed synchronously by using the same patterning process. In this case, both the second touch electrode 6 and the touch lead wire 8 are double-layered structures, and are formed by stacking a material of the second metal layer and a material of the first metal layer. The material of the first metal layer 5 may be Al, AlNd, Au, or the like, and the material of the first metal layer 5 and the material of the second metal layer may be the same or different.

In the embodiments, the second auxiliary electrode 3 is formed on the edge region of the base substrate 10 while the pattern of the first touch electrode 1 and the first auxiliary electrode 2 are formed on the base substrate 10. The second auxiliary electrode 3 and the first metal layer 5 subsequently formed thereon are used to form the touch lead wire 8. The touch lead wire 8 is connected to an external circuit to transmit a touch signal, and includes a touch driving electrode lead wire and a touch sensing electrode lead wire. By retaining the ring-shaped second auxiliary electrode 3 in the edge region, the touch lead wire of the touch panel may also be a double-layer metal stacked structure, which may reduce the impedance of the touch lead wire and further reduce the power consumption of the touch panel.

In some embodiments of the present disclosure, the pattern of the first touch electrode in the mesh shape, the first auxiliary electrode located in the meshes, and the second auxiliary electrode located in the edge region may be simultaneously formed through a single patterning process. Specifically, the second metal layer is firstly formed on the base substrate 10, and then the second metal layer is patterned to form the first touch electrode in the mesh shape, the first auxiliary electrode including the block-shaped first auxiliary sub-electrodes in the meshes, and the second auxiliary electrode located in the edge region through processes such as photoresist coating, exposing, developing, etching, and peeling off. The second touch electrode and the touch lead wire may also be formed by the same patterning process. Specifically, the first auxiliary electrode, the second auxiliary electrode, and the first metal layer subsequently formed on both the first auxiliary electrode and the second auxiliary electrode are patterned by using a single mask, to form the second touch electrode and the touch lead wire, the manufacturing process is relatively simple. In this case, compared with the related art, the method for manufacturing the touch panel provided by the embodiments of the present disclosure may increase thicknesses of the second touch electrode and the touch lead wire under similar processing conditions, which may reduce the impedances of the second touch electrode and the touch lead wire and further reduce the power consumption of the touch panel without increasing the manufacturing cost of the touch panel.

Based on the same inventive concept, the present disclosure also provides a touch panel, which may be manufactured by using the manufacturing method provided by the foregoing embodiments of the present disclosure. Referring to FIGS. 2A-6C, the touch panel includes a base substrate 10, a first touch electrode 1 and a second touch electrode 6 which are located on the base substrate 10. The first touch electrode 1 is in a mesh shape, and the second touch electrode 6 is also in a mesh shape. The second touch electrode 6 in the mesh shape and the first touch electrode 1 in the mesh shape are arranged to cross each other.

The touch panel further includes a first insulating layer 4 disposed at least in a plurality of crossing regions of the first touch electrode 1 and the second touch electrode 6 to prevent the first touch electrode 1 and the second touch electrode 6 from being electrically connected with each other. In some embodiments, as shown in FIGS. 4A and 4B, the first insulating layer 4 covers the first touch electrode 1. For example, the first insulating layer 4 is in a mesh shape and similar to the pattern of the first touch electrode 1. An orthographic projection of the first touch electrode 1 on the base substrate 10 falls within an orthographic projection of the first insulating layer 4 on the base substrate 10. Specifically, in order to make the first insulating layer 4 completely cover the first touch electrode 1, a line width of the first insulating layer 4 is increased by 3 µm to 6 µm compared to a line width of the first touch electrode 1. For example, the line width w1 of the first touch electrode 1 (that is, a width of each of wirings constituting the first touch electrode 1 in the mesh shape) generally ranges from 2 µm to 5 µm, and the line width w2 of the first insulating layer 4 may ranges from 8 µm to 11 µm.

In some embodiments, as shown in FIGS. 6A-6C, a first portion 61 between two adjacent crossing regions M of the second touch electrode 6 includes a first electrode layer 611 and a second electrode layer 612 stacked on each other. The first electrode layer 611 is located between the base substrate 10 and the second electrode layer 612, and the first touch electrode 1 and the first electrode layer 611 are provided in the same layer with the same material. A thickness of a second portion 62 of the second touch electrode 6 located in a plurality of crossing regions M is smaller than a thickness of the first portion 61 of the second touch electrode 6 located between two adjacent crossing regions M. Specifically, the first touch electrode 1 has a single-layer structure and may be formed by patterning the second metal layer. The second portion 62 of the second touch electrode 6 located in the plurality of crossing regions M has a single-layer structure, and may be formed by patterning the first metal layer 5. The first portion 61 of the second touch electrode 6 located between two adjacent crossing regions M has a double-layer structure, and is formed by patterning the second metal layer and the first metal layer 5 stacked on each other. The material of the first metal layer 5 may be Al, AlNd, Au, or the like, and the material of the second metal layer may be Al, AlNd, Au, or the like. The material of the first metal layer 5 and the material of the second metal layer may be the same or different.

In some embodiments, the touch panel further includes a touch lead wire 8, which may also be formed by patterning the second metal layer and the first metal layer 5 stacked on each other. As shown in FIG. 6B, the touch lead wire 8 includes a third electrode layer 81 and a fourth electrode layer 82 stacked on each other. The third electrode layer 81 is located between the base substrate 10 and the fourth electrode layer 82. The first touch electrode 1 and the third electrode layer 81 are formed in the same layer with the same material.

In these embodiments, compared with the related art, the thicknesses of the second touch electrode and/or the touch lead wire of the touch panel are increased, the impedances of the second touch electrode and the touch lead wire are reduced, and the power consumption of the touch panel is reduced.

In some embodiments, the touch panel further includes a second insulating layer 7. The second insulating layer 7 covers the second touch electrode 6 so as to prevent the second touch electrode 6 from being corroded by external water and oxygen. Optionally, as shown in FIGS. 6A and 6B, the second insulating layer 7 has a pattern similar to that of the second touch electrode 6, and is also in a mesh shape. An orthographic projection of the second touch electrode 6 on the base substrate 10 falls within an orthographic projection of the second insulating layer 7 on the base substrate 10. In order to make the second insulating layer 7 completely cover the second touch electrode 6, a line width of the second insulating layer 7 is increased by 3 µm to 6 µm compared to a line width of the second touch electrode 6. For example, the line width w3 of the second touch electrode 6 (that is, a width of each of wirings constituting the second touch electrode 6 in the mesh shape) generally ranges from 2 µm to 5 µm, and the line width w4 of the second insulating layer 7 may range from 8 µm to 11 µm. In the embodiments, the second insulating layer 7 only covers the second touch electrode 6, which may effectively improve the transmittance of the touch panel compared to a touch panel of which the second insulating layer covers the entire surface of the base substrate.

Some embodiment of the present disclosure further provides a touch device including the touch panel provided by the foregoing embodiments of the present disclosure. The touch device is, for example, a touch display device, and the touch display device can be any product or component with a touch display function such as a display panel, electronic paper, mobile phone, tablet computer, television, notebook computer, digital photo frame, navigator, etc.

Obviously, those skilled in the art may make various modifications and variations to the present disclosure without departing from the spirit and scope of the present disclosure. In this way, if these modifications and variations of the present disclosure fall within the scope of the claims of the present disclosure and their equivalent technologies, the present disclosure also intends to include these modifications and variations.

What is claimed is:

1. A method for manufacturing a touch panel, comprising:
   forming a first touch electrode and a first auxiliary electrode on a base substrate, the first touch electrode being in a mesh shape, the first auxiliary electrode being spaced apart from and insulated from the first touch electrode;
   forming a first insulating layer on the first touch electrode, the first insulating layer covering the first touch electrode and exposing at least a portion of the first auxiliary electrode;
   forming a first metal layer covering the first insulating layer and the at least a portion of the first auxiliary electrode; and
   patterning the at least a portion of the first auxiliary electrode and the first metal layer to form a second touch electrode in a mesh shape.

2. The method according to claim 1, wherein before forming the first touch electrode and the first auxiliary electrode on the base substrate, the method further comprises:
   forming a second metal layer on the base substrate,
   wherein the first touch electrode and the first auxiliary electrode are simultaneously formed by patterning the second metal layer.

3. The method according to claim 1, wherein before forming the first metal layer, the method further comprises:
   forming a second auxiliary electrode on an edge region of the base substrate, the first metal layer formed subsequently covering at least a portion of the second auxiliary electrode; and
   patterning the first metal layer and the at least a portion of the second auxiliary electrode to form a touch lead wire.

4. The method according to claim 3, wherein the first touch electrode, the first auxiliary electrode, and the second auxiliary electrode are formed simultaneously by using a same patterning process.

5. The method according to claim 3, wherein the second touch electrode and the touch lead wire are formed by using a same patterning process.

6. The method according to claim 1, wherein the first insulating layer is in a mesh shape, and an orthographic projection of the first touch electrode on the base substrate falls within an orthographic projection of the first insulating layer on the base substrate.

7. The method according to claim 6, wherein a line width of the first touch electrode ranges from 2 μm to 5 μm, and a line width of the first insulating layer ranges from 8 μm to 11 μm.

8. The method according to claim 1, further comprising: forming a second insulating layer on the base substrate on which the second touch electrode is formed, the second insulating layer covering the second touch electrode.

9. The method according to claim 8, wherein the second insulating layer is in a mesh shape, and an orthographic projection of the second touch electrode on the base substrate falls within an orthographic projection of the second insulating layer on the base substrate.

10. The method according to claim 9, wherein a line width of the second touch electrode ranges from 2 μm to 5 μm, and a line width of the second insulating layer ranges from 8 μm to 11 μm.

11. The method according to claim 1, wherein an interval between the first auxiliary electrode and the first touch electrode ranges from 3 μm to 5 μm.

12. The method according to claim 1, wherein the first touch electrode in the mesh shape has a plurality of openings, the first auxiliary electrode comprises a plurality of first auxiliary sub-electrodes, and the plurality of the first auxiliary sub-electrodes are located in the plurality of openings, respectively.

13. A touch panel comprising:
a base substrate;
a first touch electrode in a mesh shape and a second touch electrode in a mesh shape on the base substrate, and the second touch electrode and the first touch electrode being arranged to cross each other; and
a first insulating layer disposed at least in a plurality of crossing regions of the first touch electrode and the second touch electrode, and disposed between the first touch electrode and the second touch electrode;
wherein a first portion of the second touch electrode located between at least two adjacent crossing regions comprises a first electrode layer and a second electrode layer stacked on each other, the first electrode layer is located between the base substrate and the second electrode layer, and the first touch electrode and the first electrode layer are arranged in a same layer with a same material.

14. The touch panel according to claim 13, further comprising:
a touch lead wire located at an edge region of the base substrate,
wherein the touch lead wire comprises a third electrode layer and a fourth electrode layer stacked on each other, the third electrode layer is located between the base substrate and the fourth electrode layer, and the first touch electrode and the third electrode layers are arranged in a same layer with a same material.

15. The touch panel according to claim 13, wherein the first insulating layer is in a mesh shape, and an orthographic projection of the first touch electrode on the base substrate falls within an orthographic projection of the first insulating layer on the base substrate.

16. The touch panel according to claim 15, wherein a line width of the first touch electrode ranges from 2 μm to 5 μm, and a line width of the first insulating layer ranges from 8 μm to 11 μm.

17. The touch panel according to claim 13, further comprising:
a second insulating layer on the second touch electrode, wherein the second insulating layer covers the second touch electrode.

18. The touch panel according to claim 17, wherein the second insulating layer is in a mesh shape, and an orthographic projection of the second touch electrode on the base substrate falls within an orthographic projection of the second insulation layer on the base substrate.

19. The touch panel according to claim 18, wherein a line width of the second touch electrode ranges from 2 μm to 5 μm, and a line width of the second insulating layer ranges from 8 μm to 11 μm.

20. A touch device comprising the touch panel according to claim 13.

* * * * *